No. 843,404. PATENTED FEB. 5, 1907.
C. E. LOGAN.
WIRE STRETCHER.
APPLICATION FILED JUNE 20, 1906.
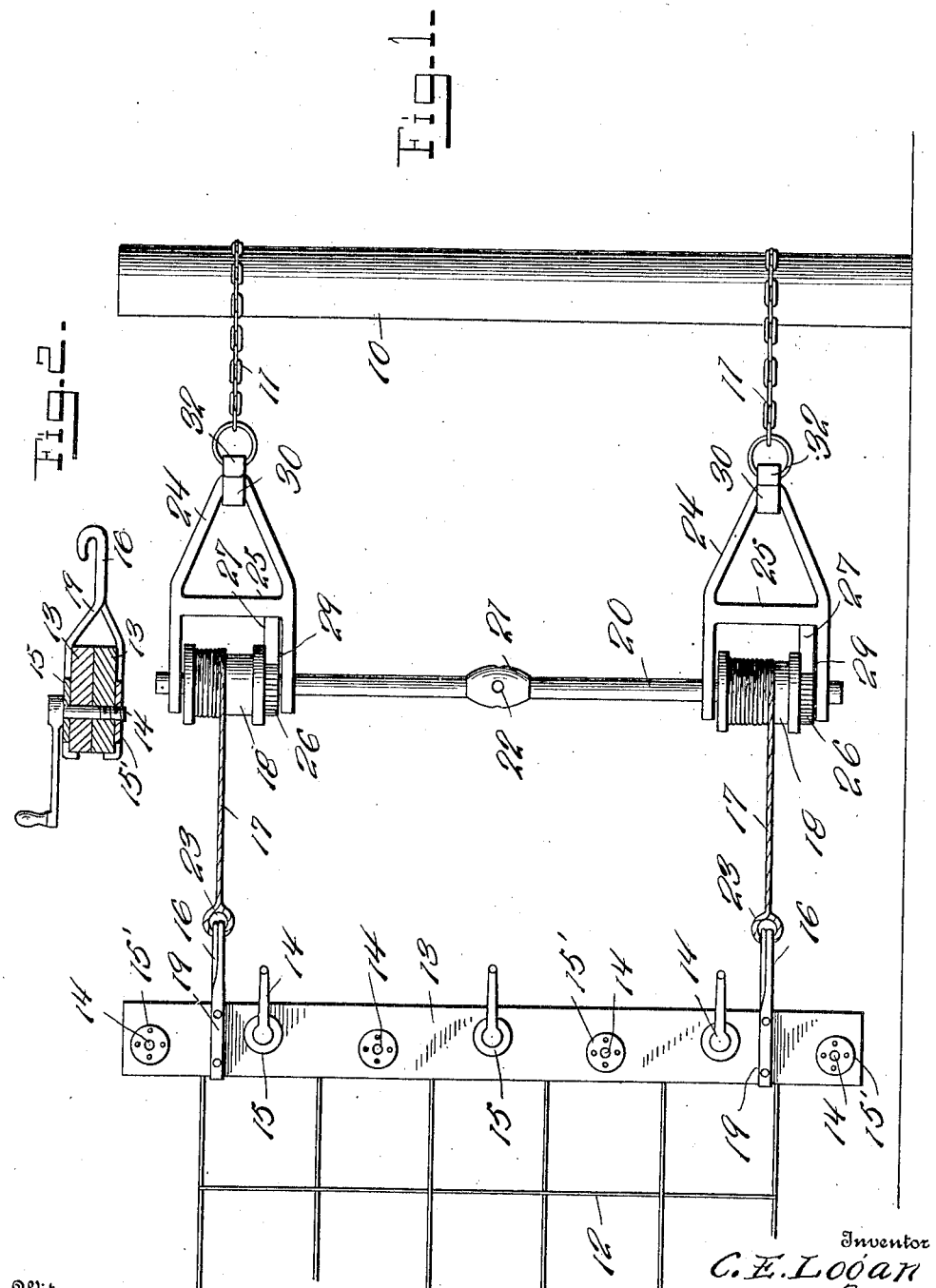

UNITED STATES PATENT OFFICE.

CHARLES E. LOGAN, OF MILL GROVE, MISSOURI.

WIRE-STRETCHER.

No. 843,404.  Specification of Letters Patent.  Patented Feb. 5, 1907.

Application filed June 20, 1906. Serial No. 322,580.

*To all whom it may concern:*

Be it known that I, CHARLES E. LOGAN, a citizen of the United States, residing at Mill Grove, in the county of Mercer, State of Missouri, have invented certain new and useful Improvements in Wire-Stretchers; and I do hereby declare the following to be a full, clear, and exact description of the invention, such as will enable others skilled in the art to which it appertains to make and use the same.

This invention has relation to clamping-bars for stretching wire for fences, and particularly woven wire, and it has for its object the provision of improvements that will render the machine more efficient, stronger, more durable, and ready of operation than heretofore.

The nature of the invention is embodied in the machine shown in the annexed drawings, forming a part of this specification, and is composed of a number of novel parts and combinations of parts, as is hereinafter described in detail, in view of the said drawings, and pointed out with distinctness and particularity in the subjoined claims.

Of the said drawings, Figure 1 is a front elevation of the machine, showing it as applied to a woven-wire fence in the act of stretching the same. Fig. 2 is a horizontal section through the clamping-bars and one set of means for clamping them together.

Similar figures of reference designate similar parts or features, as the case may be, wherever they occur.

In the drawings, 10 designates a fence-post to which the stretching device is connected through the intervention of chains 11, as will presently more clearly appear. 12 designates the woven-wire fence, though it might as well be individual wires forming a fence when stapled to posts, a portion of which woven-wire fence is secured between the two clamp-bars 13 by means of crank-screws 14, each passed through a flanged bearing 15 on one bar and tapped into a flanged nut 15', secured in the opposite bar, the nuts and bearings alternating on the bars, as shown, in order to get a more effective clamping force, or, in other words, so as to hold the woven-wire fence more effectively. There are shown to be seven of these clamping-screws employed on the bars here shown, though the number may be greater or less, as may be desired.

16 designates hooks for the reception of the loops formed on the ends of the rope 17 wound on the drums 18 to stretch the wire. The said hooks have divided shanks 19, that embrace the clamp-bars 13, the hooks extending forward from the latter at the top and bottom.

A portion of the fence being clamped between the clamp-bars the drums will be turned to wind up the rope and stretch the fence to the desired degree, when it will be stapled to the posts, the pawls will be lifted to allow the drums to turn back, and the stress on the rope relaxed and the device moved to another post to repeat the action described on another section of fence.

What is claimed as the invention is—

1. The combination with the clamp-bars provided with a plurality of flanged nuts secured to one bar, crank-screws tapped into said nuts, flanged bearings for the screws on the opposite bar through which the screws pass, the nuts and bearings alternating with the two bars, as shown.

2. The combination with the clamp-bars provided with a plurality of flanged nuts secured to one bar, crank-screws tapped into said nuts, flanged bearings for the screws on the opposite bar through which the screws pass, the nuts and bearings alternating with the two bars, as shown, and hooks for engaging the eyes of the rope having divided ends embracing the said clamp-bars.

In testimony whereof I affix my signature in presence of two witnesses.

C. E. LOGAN.

Witnesses:
 H. W. OYLER,
 P. S. MOFFITT.